United States Patent Office 3,390,958
Patented July 2, 1968

3,390,958
PROCESS FOR PREPARING CRYSTALLINE
ZEOLITIC MOLECULAR SIEVES
Peter A. Howell, St. Paul, Minn., assignor to Union
Carbide Corporation, a corporation of New York
No Drawing. Filed Oct. 19, 1964, Ser. No. 404,973
7 Claims. (Cl. 23—112)

ABSTRACT OF THE DISCLOSURE

Improved process for preparing zeolitic molecular sieves which comprises crystallizing said zeolites from conventional reaction gel composition therefore in which the principal source of silica and alumina is derived from post-calcined, acid-extracted kaolin which possesses not more than about 30% residual crystallinity.

---

The present invention relates in general to a novel method for preparing zeolitic molecular sieves, and more particularly to a process for preparing molecular sieves of relatively high silica-to-alumina ratios using acid-extracted metakaolin.

Crystalline zeolitic molecular sieves widely used in industry include both naturally-occurring species and a considerable number of synthetic types, a few of which resemble naturally-occurring but scarce mineral species.

Characteristically, zeolitic molecular sieves as used herein are those crystalline metal aluminosilicates having the general composition stoichiometrically expressed in terms of moles of oxides by the formula:

$$M_2O/n:Al_2O_3:xSiO_2:yH_2O$$

wherein M represents a metal ion and $n$ represents its valence. Generally a particular zeolite will have a definite range of values for $x$ and $y$.

Of particular importance with respect to the present invention are those crystalline zeolites corresponding to the general formula above in which $x$ has a relatively high value, i.e., greater than 3.

Basically, the crystalline zeolites possessing molecular sieve properties have the configuration of a rigid three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two, i.e., $$O/(Al+Si)=2$$

The electrovalence of each tetrahedra containing aluminum is balanced by the inclusion in the crystal of a cation, for example, an alkali or alkaline earth metal ion. With the recent successes in preparing a number of new synthetic crystalline zeolites it also became apparent that certain molecular sieves of quite different adsorption and other physical properties could not be distinguished solely on the basis of X-ray diffraction pattern or of stoichiometric composition. It also became apparent that with changing ratios of silicon to aluminum the techniques of obtaining high yields of a single desired crystalline species are much more exacting for the more siliceous zeolites than for others, e.g., zeolite X (U.S.P. 2,882,244 to R. M. Milton) or zeolite A (U.S.P. 2,882,243 to R. M. Milton). The $SiO_2/Al_2O_3$ molar ratios of zeolite X and zeolite A as defined in these patents are 2.5±0.5 and 1.85±0.5 respectively.

Crystalline sodium zeolite Y having a $SiO_2/Al_2O_3$ molar ratio of greater than 3 up to about 6 (described in detail in U.S.P. 3,130,007, issued Apr. 21, 1964, in the name of D. W. Breck) has been found to be especially difficult to prepare consistently in high yields in large-scale commercial operations. It is for this reason conventional to employ as reactants relatively pure and hence relatively expensive sources of alumina and silica such as gamma alumina, alumina trihydrate, sodium aluminate, sodium silicate, silica gels, and aqueous colloidal silica sols. With zeolites of lower silica content such as zeolite A on the other hand, it has been found that a reactive amorphous kaolin such as metakaolin provides an inexpensive reactant material supplying substantially all of the silicon and aluminum necessary to form the desired crystalline zeolite. It has been quite difficult, however, to utilize reactive kaolin as the major source of silicon and aluminum in the preparation of zeolite Y to produce consistently a high-purity product, i.e. a product substantially free of other aluminosilicate materials.

It is therefore the general object of the present invention to provide a process for preparing high-silica zeolitic molecular sieves which employs as the major source of oxides of silicon and aluminum an inexpensive kaolin-type mineral.

It is a more particular object to provide a process for preparing consistently substantially pure crystalline zeolite Y in high yields from a reactive amorphous kaolin as the basic starting material.

These and other objects which will be obvious from the specification hereinafter are accomplished in accordance with the process of this invention which comprises contacting reactive amorphous kaolin with an aqueous mineral acid solution to increase the $SiO_2/Al_2O_3$ molar ratio thereof to within the range of from about 6 to about 270, separating the solid clay residue and drying said residue, firing the clay residue at a temperature of from about 550° C. to about 825° C. for a period of at least about 1 hour, preparing a reaction mixture containing said fired clay residue and having in the aggregate water, alkali metal hydroxide, and the oxides of silicon and aluminum in proportions required to form crystals of the desired zeolitic molecular sieve, thermally treating the mixture at a temperature between about 20° C. and about 120° C. under at least autogenous pressure until crystals of the zeolitic molecular sieve form, and thereafter separating and recovering the zeolite crystals.

In a particularly preferred embodiment of the invention, the kaolin-type clay is, prior to acid extraction, converted to amorphous metakaolin by calcining.

Kaolin-type clays or clay minerals have the general composition $Al_2O_3 \cdot 2SiO_2 \cdot 2-4H_2O$. These clays may be considered as sheet-like crystalline silicates. Their basic structural unit is an aluminosilicate sheet consisting of a layer of silicon cations in tetrahedral co-ordination with oxygen anions, bonded to a layer of aluminum cations in octahedral coordination with oxygen or hydroxyl anions. These sheets are stacked one on top of another to form the small plate-like crystals of the mineral. Representative of the clay minerals which contain this two-layer sheet and which may be used in the process of this invention are: kaolinite, livesite, nacrite, dickite, endellite and halloysite. They differ only in the way that the basic structural sheets are stacked. Pure kaolinite, $$Al_2O_3 \cdot 2SiO_2 \cdot 2H_2O$$

has the composition by weight                 Percent
$Al_2O_3$ ------------------------------------- 39.56
$SiO_2$ -------------------------------------- 46.54
$H_2O$ (combined) --------------------------- 13.90

These clays when suitably treated appear to undergo several transitions, although the exact natures of the products of such transitions are not clearly known nor are the mechanisms of the behavior during heating completely understood. There is in fact, considerable speculation and disagreement in the literature concerning this problem. When kaolin-containing clays are heated in air, the first of these transitions is observed to begin at about 550°

C.–600° C., where the crystalline silicate sheets are apparently destroyed or at least altered or disordered to yield a product which is essentially amorphous to X-rays. This transition product or metastable phase is sometimes referred to as "metakaolin," "metakaolinite," "dehydrated kaolin," or "dehydroxylated kaolinite." Roy et al. [Jour. Amer. Ceram. Soc., 38, 205 (1955)] have defined "metakaolinite" as "a meta-stable high-free-energy phase in the range of 600° C. to 900° C."

As stated hereinabove, the nature of the transformed kaolin associated with a thermal treatment in the range of about 550°–850° C. is not clearly known, because it is essentially amorphous to X-rays. By "amorphous to X-rays" is meant that the X-ray spectrometer trace exhibits substantially no sharp diffraction bands and is similar to that obtained for a glass. For reasons given hereinbelow this transformed kaolin as is used in the process of this invention will be referred to as "reactive kaolin."

Kaolin-type clays are also known by such names as "ball clay," "fire clay," "papermaking clay," "filler clay," "coating clay," and "china clay." Commercial kaolins may be contaminated with quartz, fine-grained mica, hydrous micas and sometimes feldspar, but their presence at impurity levels will generally not be detrimental.

Table A below includes analyses of several kaolin-type clays found to be suitable in the process of this invention. As may be observed, the mole ratio of $SiO_2/Al_2O_3$ in the specimens varies from about 1.9 to about 2.20.

peratures of about 600° C. to 700° C., the firing time may be about one hour or more; in the region of about 700° C. to 800° C., firing time of as low as 10–15 minutes have been used with satisfactory results when relatively thin beds of charge material on the order of ½–¾ inch in depth are used. At 700° C.–800° C. at least about one hour is usually preferred to insure thorough treatment of the charge; a 16-hour firing period at 700° C. has proven quite satisfactory.

After a kaolin-type material has been brought into a reactive condition for the method of the invention this condition of reactivity is retained during storage periods. Thus, for example, in the process of this invention one may also use as a starting material a commercially available kaolin-containing material that has already been suitably treated to achieve the desired transformation to metakaolin as previously described, or alternatively, a mixture comprising portions of an unfired kaolin and kaolin that already has been fired at temperatures not exceeding about 850° C. This mixture is then fired by heating within a furnace or by other suitable means to convert substantially all of the unfired material to the required "reactive kaolin" state.

At about 850° C., as stated hereinabove, another transition or conversion of the structure takes place such that the resulting material is not as reactive as is material fired for about one hour below 850° C. but above about 600° C. In summary, the range of firing temperatures associated with substantial yields of crystalline zeolites generally corresponds to the stability region for a particular phase or condition of kaolin-type structure.

TABLE A.—ANALYSES OF TYPICAL KAOLIN-TYPE MATERIALS

| Oxide | Georgia Kaolinite A | | Georgia Kaolinite B | | North Carolina Kaolinite C | | Utah Halloysite | |
|---|---|---|---|---|---|---|---|---|
| | Percent by wt. | Moles | Percent by wt. | Moles | Percent by wt. | Moles | Percent by wt. | Moles |
| $Na_2O$ | 0.2 | | 0.40 | | 0.82 | | 0.1 | |
| $K_2O$ | 0.1 | | 0.43 | | | | | |
| $Al_2O_3$ | 40.2 | 1.0 | 37.20 | 1.00 | 37.2 | 1.0 | 37.3 | 1.00 |
| $SiO_2$ | 45.0 | 1.9 | 44.82 | 2.04 | 48.2 | 2.20 | 41.6 | 1.89 |
| Ign. loss (as $H_2O$) | 9.4 | 1.33 | 14.68 | 2.23 | 13.1 | 1.99 | 20.0 | 3.04 |
| $TiO_2$ | 2.5 | | 1.26 | | | | | |
| Other | 1.4 | | 1.31 | | 0.78 | | | |
| | 98.8 | | 100.1 | | 100.1 | | 98.9 | |

In order that the reactive kaolin be readily treated in the process of this invention, it is preferred that it be in powdered form of average equivalent spherical diameter less than about 50 microns size, down to about 0.2 micron. Powder sizes up to about 200 mesh may be employed, with however some disadvantage in these regards.

When the clay material is to be converted to "reactive kaolin" by a thermal treatment prior to acid extraction, the temperatures and times at which the conversion is best carried out are interdependent. For instance, a minor degree of conversion will take place at temperatures at, and slightly below 575° C.; that is, on a percentage basis, there will be some reactive kaolin in any batch being treated. Above 600° and preferably between 600° C. and 850° C. total conversion might be expected if the firing conditions are maintained for a sufficient length of time. From the following discussion it will be clear that a higher firing temperature lessens the time required, and conversely at the minimum temperature of about 600° C., a considerably greater period will be required to bring about a suitable degree of conversion. At temperatures exceeding about 850° C. the conversion process leads to material that when employed to produce a given zeolite also yields impurity products that impair the molecular sieving property of the desired zeolite.

The time interval during which the kaolin-containing mineral should be held at 600°–850° C. in the firing step must also be controlled if substantial quantities of crystalline molecular sieve zeolite are to be produced in the subsequent steps of the process of the invention.

It has been determined that at a firing temperature of 600° C. from about 45 to 60 minutes are ordinarily required to produce metakaolin, although some alteration of the original kaolin structure was found to have occurred after a ten-minute firing at 600° C. At firing tem- Ambient air is preferred and is conveniently used as the atmosphere in which the kaolin-type materials are fired; however, other firing atmospheres may be used if desired. We have found that inert atmospheres such as nitrogen stream can somewhat reduce the low-temperature level at which reactive kaolin can be prepared. Acid gases such as $CO_2$ and HCl were found less effective as firing atmospheres than nitrogen, and moving gas streams were more effective than still air.

Although not as preferred as calcination, intensive attrition is an alternate procedure for preparing reactive aluminosilicates for use in the present invention after said extraction. The intensive attrition is conducted with the kaolin in a dry or substantially dry condition, but containing a substantial quantity of bound water, until the original crystalline, or quasi-crystalline or otherwise ordered structure is brought to a condition where it is essentially amorphous to X-rays. Unless the kaolin is brought to such an amorphous condition, little or no crystalline zeolite of the molecular sieve type is obtained as the product of the method of the invention, and the products will be largely aluminosilicates or mixtures thereof. As the period of time during which the kaolin is subjected to intensive attrition increases, the X-ray diffraction pattern is progressively altered to substantially eliminate the characteristic sharp peaks on the trace indicative of a crystalline or quasi-crystalline condition, thus yielding a pattern which is characteristic of an essentially amorphous product. The degree of degradation of X-ray crystallinity in the attrited kaolin can be measured by the intensity of reflection, i.e., the peak height of characteristic lines on the diffractometer trace, relative to the intensity or peak height of the same lines in the untreated kaolin. At least about 70 percent degradation of X-ray crystallinity, i.e., not more than about 30 percent residual crystallinity, should be attained, and preferably at least about 85 percent degradation for high-purity product.

It is emphasized that simply reducing the particle size of the kaolin is not enough to produce a reactive substance, i.e., the kaolin can be ground to a fine powder, but if the original ordered internal structure substantially still remains upon X-ray examination, the ground material will not be sufficiently reactive for the purposes of the present invention. Electron micrographs of samples of kaolin taken at various times during the attrition process indicate that reduction in particle size proceeds to a certain point, beyond which no further reduction can be detected, and then the particles actually begin to reagglomerate and surface area decreases. There is apparently no clear relationship between the particle size and the degree of internal order or crystallinity of the kaolin being treated. Particle size reduction is a common means of increasing rate of reaction in a chemical or physical process, the objective thereof being to increase the surface area available for reaction and thereby obtain completeness and rapidity of reaction. In the case of the present invention, however, reactivity for zeolite synthesis is achieved not merely through an increase in surface area but primarily through a degradation or severe dislocation of the internal structure of the kaolin, as evidenced by a substantial loss of characteristic peaks in the X-ray pattern of the untreated kaolin.

The actual length of time during which the kaolin is subjected to intensive attrition varies with the type of attrition apparatus used and the efficiency of the attrition process, but the ultimate controlling factor is that the attrition treatment is to be continued until substantial loss of crystallinity is achieved. For instance, it has been found that sufficient attrition of the kaolin may be achieved by employing such apparatus as an automatic mortar and pestle or a vibratory ball-mill. Using the latter device, attrition times as short as 4 hours have been sufficient to alter a kaolin to the reactive condition as evidenced by substantial loss or degradation of characteristic X-ray structure. Using the former device, kaolin becomes amorphous to X-rays after 48 hours of attrition treatment. The slight temperature rises observed during attrition treatments, of the order of 20–50° C., are too small to be of consequence in altering the structure of the mineral and making it reactive for the purposes of the present invention. Wet ball-milling, as with a kaolin-water slurry, was found to be far less efficient than when the attrition was conducted in a dry state. The mineral as received from the source and prior to its introduction to the attrition equipment or apparatus may be in pellet or powder form.

Other attrition devices which may be used to bring the kaolin to a suitably reactive condition are, for example, roller mills, pebble mills, rod mills, tube mills, disk mills, attrition mills and fluid-energy or jet mills. The selection of a particuar device to accomplish the intensive attrition required may depend on such factors as capacity requirements, initial state of subdivision of the mineral, cost of equipment, power and labor, and the like.

After the kaolin has been converted to an amorphous state, it is then treated with an aqueous solution of a strong mineral acid such as hydrochloric, sulfuric, nitric or phosphoric, preferably hydrochloric, to decrease the aluminum content with respect to silicon. Maximum benefit can be obtained from the overall process of this invention if the acid extraction treatment is so conducted that the $SiO_2/Al_2O_3$ ratio of the acid-extracted kaolin is within one of the $SiO_2/Al_2O_3$ ranges which provides, in conjunction with aqueous caustic, a reactant mixture composition preferentially giving rise to zeolite Y. It is permissible to extract greater or lesser percentages of aluminum and thereafter adjust the $SiO_2/Al_2O_3$ ratio of the reactant mixture to the desired value by the addition of alumina, sodium aluminate, silica, sodium silicate, or the like. For example, high-purity zeolite Y has been prepared from meta-kaolin treated according to the method of the invention to effect $SiO_2/Al_2O_3$ ratios as high as 270 with the reactant mixture composition suitably adjusted by addition thereto of sodium aluminate. By contrast, the same reactant system attained in the same manner except that the acid-extracted kaolin was not subjected to firing after acid treatment produced only very small amounts of zeolite Y in combination with gross amounts of other aluminosilicates.

Numerous kaolinitic minerals have heretofore been acid-extracted for diverse purposes other than use in the present process. Although in general the prior known procedures were directed toward total removal of the $Al_2O_3$ content, the factors which affect the rate and degree of $Al_2O_3$ removal therein are well known and are applicable to the acid-extraction step of this invention.

For example, the average particle size of the clay, the particular acid employed, the relative concentration of acid, water and clay, the temperature of the reaction system, the time of reaction, and the intimacy of contact of the reagents are all factors to be considered in arriving at an acid-treated kaolin of desired $SiO_2/Al_2O_3$ ratio. Whereas the effect of each of these factors is obvious to those skilled in the art, the results obtained by varying several factors while maintaining others constant are shown in the examples appearing hereinafter.

Following acid extraction, the solid clay residue of desired $SiO_2/Al_2O_3$ ratio is washed and advantageously dried at around 100–120° C. The residue is thereafter subjected to a firing step, using a purge gas such as air, nitrogen, etc., at temperatures within the range of from about 550° C. to about 825° C. for a period of from about 1 to about 24 hours. Although the nature of the changes produced in the acid-extracted meta-kaolin by this subsequent firing step are not fully understood or readily observable, it has been surprisingly found that high-purity zeolite Y cannot be produced from meta-kaolin if this step is omitted. Equally surprising is the finding that, although essential to the preparation of high purity zeolites having high $SiO_2/Al_2O_3$ molar ratios (i.e. greater than ~3), the inclusion or omission of the same firing step does not appear in any way to affect the preparation of zeolites having lower $SiO_2/Al_2O_3$ molar ratios.

After having undergone a suitable activation, extraction, and firing treatment, the clay now is combined into an aqueous reactant mixture having an over-all composition, conveniently expressed in terms of oxide-mole ratios, suitable for preparation of substantially pure zeolite Y. The other reactants used may include water, alkali metal hydroxide, and such sodium silicate and/or sodium aluminate or other source of aluminum as may be required to achieve the desired mole ratios when acid-extracted and fired kaolin of various $SiO_2/Al_2O_3$ mole ratios are employed as starting materials, the ingredients being combined in such proportions that the initial over-all composition of the reactant mixture in terms of oxide-mole ratios is:

$$Na_2O/SiO_2 = a$$
$$SiO_2/Al_2O_3 = b$$
$$H_2O/Na_2O = c$$

where the particular values of $a$, $b$, and $c$ hereinbelow defined are the essential deteriminants. The initial mixing of reactants is preferably conducted at about room temperature.

In the preparation of sodium zeolite Y as described hereinbelow, it has been found that the composition of the initial reactant mixture is critical. The digestion-crystallization or reaction temperatures and the duration of the several reaction steps are also important variables in determining the yield of crystalline sodium zeolite Y.

Certain reactant ratios are found to be useful in synthesizing crystalline sodium zeolite Y from reaction mixtures containing acid-treated aluminosilicate minerals which have been thereafter fired. As an example, in preparing sodium zeolite Y, a reactant mixture derived at least in part from a reactive acid-treated, fired kaolin and having a composition, expressed in terms of oxide-mole ratios, within any of the following ranges may be employed:

|  | Range 1 | Range 2 |
|---|---|---|
| $Na_2O/SiO_2$ | 75–1.0 | 0.40–0.6 |
| $SiO_2/Al_2O_3$ | About 6 to 30 | About 6 to 30 |
| $H_2O/Na_2O$ | About 40 to 60 | About 20 to 60 |

A preferred range of initial reactant compositions particularly suitable for preparing high-purity zeolite Y from reactive kaolin is as follows:

$Na_2O/SiO_2$ ------------------------------ 0.4–0.6
$SiO_2/Al_2O_3$ ------------------------------ 6.5–14
$H_2O/Na_2O$ ------------------------------ about 40

Digestion of the alkaline reactant mixture of the present invention can be accomplished generally by a single step wherein the temperature ranges from about 20° C. up to about 120° C., or alternatively by a two-step process wherein each step is conducted for non-coextensive temperature ranges. The low temperature step is in ssence an aging step and the elevated temperature step is primarily the crystallization step.

The two-step method includes a first step wherein digestion is conducted in the temperature range of 20° C. to 55° C. and a second step, that of crystallization, being conducted in the temperature range of about 75° C. to about 120° C. The first or initial digestion step, while it may be performed at room temperature, is found to be appreciably shortened if conducted within a preferred range of 40° to 55° C. and furthermore permits a shorter second-step crystallization period.

The overall process of the present invention as well as the individual steps which in combination comprise the over-all process are illustrated and clarified in the following examples:

Example 1

Samples of meta-kaolin were prepared by heating at about 700° C. for 16 hours commercially available Georgia kaolin clay (Hydrite PD–121, Georgia Kaolin Company). In a series of acid extractions, mixtures of the meta-kaolin samples with aqueous hydrochloric acid and aqueous sulfuric acid solutions of various concentrations were carried out for 2 hours at 100° C. and 1 additional hour at about 23° C. The mixture was stirred occasionally throughout the extraction period. The concentration of the acid solutions, the proportion of acid and clay and the $SiO_2/Al_2O_3$ ratio of the extracted product are shown in Table I below.

TABLE I

| Sample | Acid | Concentration of Acid Solution | Acid/Clay Ratio* | Product, $SiO_2/Al_2O_3$ |
|---|---|---|---|---|
| (a) | HCl | 12 normal | 1.0 | 10.9 |
| (b) | HCl | 8 normal | 1.0 | 24.8 |
| (c) | HCl | 6 normal | 1.0 | 35.8 |
| (d) | HCl | 4 normal | 1.0 | 36.4 |
| (e) | HCl | 2 normal | 1.0 | 22.8 |
| (f) | HCl | 4 normal | 0.5 | 5.6 |
| (g) | HCl | 6 normal | 0.5 | 3.9 |
| (h) | HCl | 4 normal | 0.4 | 3.8 |
| (i) | HCl | 6 normal | 0.6 | 6.2 |
| (j) | $H_2SO_4$ | 4 normal | 0.8 | 10 |
| (k) | $H_2SO_4$ | 4 normal | 0.9 | 20 |
| (l) | $H_2SO_4$ | 4 normal | 0.2 | 2.8 |

*Based on the equation

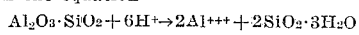
$$Al_2O_3 \cdot SiO_2 + 6H^+ \rightarrow 2Al^{+++} + 2SiO_2 \cdot 3H_2O$$

the acid/clay ratio equals 6 times the equivalents of acid used divided by the number of moles of $Al_2O_3$ in the system.

Example 2

(A) The effect of agitation of the acid-clay mixture is illustrated by the data of Table II obtained extraction systems of meta-kaolin and hydrochloric acid at the boiling temperature of 4 N HCl, the aqueous acid employed.

The acid/clay ratio of each of the samples was established initially at 1.0.

TABLE II

| Sample | Extraction Time, hrs. | Agitation | Product $SiO_2/Al_2O_3$ |
|---|---|---|---|
| (a) | 16.5 | Static | 5.2 |
| (b) | 4 | do | 4.0 |
| (c) | 16 | do | 5.0 |
| (d) | 2.8 | Boiling Flask | 24.3 |
| (e) | 4.5 | Heating and Stirring | 89.8 |

(B) Extracted sample (e) of part (A) was isolated and again extratced for a similar period under the same conditions using 4 N HCl. The resultant product had an $SiO_2/Al_2O_3$ ratio of 266.

Example 3

To demonstrate that acid-extracted meta-kaolin is definitely altered by a subsequent firing treatment a sample portion of hydrochloric acid-extracted meta-kaolin having a $SiO_2/Al_2O_3$ ratio of about 125 was fired in air at 700° C. for 4 hours. The sorption properties of the fired sample were compared with those of an unfired portion of the same acid-extracted material. The comparison appears in Table III below.

TABLE III

| Sorbate and Conditions | Grams of sorbate per 100 grams acid-extracted kaolin | |
|---|---|---|
|  | Unfired | Fired |
| $H_2O$ at 23.5° C., 2 mm. Hg | 7.8 | 0.1 |
| $H_2O$ at 23.5° C., 10 mm. Hg | 13.8 | 2.5 |
| $H_2O$ at 23.5° C., 24 mm. Hg | 19.3 | 9.3 |
| $N_2$ at −196° C., 50 mm. Hg | 12.2 | 2.0 |
| $N_2$ at −196° C., 700 mm. Hg | 17.5 | 4.6 |
| n-Butane at 23.5° C., 600 mm. Hg | 5.2 | 2.1 |

These isotherms show that firing acid-extracted meta-kaolin destroys its internal surface and hence most of its adsorptive capacity, but do not establish the effect this internal surface has on the synthesis of high silica crystalline zeolites.

In the following examples showing the preparation of crystalline zeolite Y from fired acid-extracted meta-kaolin, the initial extraction of meta-kaolin was carried out using approximately 5 N aqueous hydrochloric acid solutions with varying times, degrees of agitation and acid/clay ratios to obtain extraction products having varying $SiO_2/Al_2O_3$ ratios. All extratced products were dried at 100° C. and then fired for 16 hours at 700° C. before being incorporated into the zeolite Y synthesis system.

Example 4

Using an acid extracted and refired sample of meta-kaolin having a $SiO_2/Al_2O_3$ ratio of 10.0, a reaction system was formed by mixing same with water and sodium hydroxide solution having a composition expressed in mole ratios of oxides as follows:

$Na_2O/SiO_2$ ---------------------------------- 0.5
$SiO_2/Al_2O_3$ ---------------------------------- 10.0
$H_2O/Na_2O$ ---------------------------------- 40

The system was aged by agitation in a glass reactor under atmospheric pressure at a temperature of about 23° C. (room temperature) for 24 hours, after which period the temperature was increased to 100° C. and the reaction mixture allowed to remain static at this temperature for 72 hours to produce crystals of zeolite Y. After crystallization the solids were separated from the mother liquor by suction filtration and washed with distilled water until the pH of the wash effluent was about 10.5. The powder was then dried at 100° C. The product was identified by X-ray and chemical analysis to be substantially 100% zeolite Y having a $SiO_2/Al_2O_3$ ratio of 4.03.

Example 5

(A) Using an acid-extracted and refired sample of meta-kaolin having a $SiO_2/Al_2O_3$ ratio of about 266, a reaction mixture was formed by mixing same with water, sodium hydroxide solution and sodium aluminate, said mixture having a composition expressed in mole ratios of oxides as follows:

| | |
|---|---|
| $Na_2O/SiO_2$ | 0.44 |
| $SiO_2/Al_2O_3$ | 12.0 |
| $H_2O/Na_2O$ | 40 |

The mixture was aged by stirring in a glass reactor under atmospheric pressure at a temperature of about 23° C. (room temperature) for about 24 hours, after which period the temperature was increased to 100° C. and the reaction mixture allowed to remain static for 72 hours to produce crystals of zeolite Y. After crystallization the solids were separated from the mother liquor by suction filtration and washed with distilled water until the pH of the wash effluent was about 10.5. The powder was then dried at 100° C. The product was identified by X-ray and chemical analysis to be substantially 100% zeolite Y having a $SiO_2/Al_2O_3$ ratio of 4.36.

(B) To demonstrate the effect of firing the meta-kaolin after acid extraction, an acid extracted meta-kaolin having a $SiO_2/Al_2O_3$ ratio of about 266 was incorporated directly without refiring into a reaction mixture formed of, in addition to the meta-kaolin, water, sodium hydroxide solution and sodium aluminate, said mixture having a total composition expressed in terms of mole ratios of oxides as follows:

| | |
|---|---|
| $Na_2O/SiO_2$ | 0.54 |
| $SiO_2/Al_2O_3$ | 10.9 |
| $H_2O/Na_2O$ | 40 |

The mixture was aged and crystallized using the same procedure as in part (A) above. The product crystals, however, contained only about 5% zeolite Y, with the remainder being principally synthetic gmelinate and zeolite B.

Example 6

Using an acid-extracted and refired portion of meta-kaolin having an $SiO_2 \cdot Al_2O_3$ ratio of 9.6, an aqueous reactant mixture was prepared by combining same with water, and sodium hydroxide, such that the resultant mixture had an overall composition, expressed in terms of mole ratios of oxides, as follows:

| | |
|---|---|
| $Na_2O/SiO_2$ | 0.5 |
| $SiO_2/Al_2O_3$ | 9.6 |
| $H_2O/Na_2O$ | 40 |

This mixture was digested and crystallized for 72 hours at 100° C. under static conditions. The solids were separated from the liquor by filtration and washing as in Example 5. The product was dried at 100° C. and samples were identified and characterized by chemical, adsorption and X-ray analyses as zeolite Y of about 95% purity, with an $SiO_2/Al_2O_3$ ratio of 3.73.

Example 7

Using an acid-extracted and refired portion of meta-kaolin having an $SiO_2/Al_2O_3$ ratio of 14.0, an aqueous reactant mixture was prepared by combining same with water and sodium hydroxide, such that the resultant mixture had an overall composition, expressed in terms of mole ratios of oxides as follows:

| | |
|---|---|
| $Na_2O/SiO_2$ | 0.75 |
| $SiO_2/Al_2O_3$ | 14.0 |
| $H_2O/Na_2O$ | 40 |

This mixture was aged by stirring in a glass reactor under atmospheric pressure at room temperature (about 25° C.) for 48 hours, after which period the temperature was increased to 100° C. and the reaction mixture allowed to remain static at this temperature for 72 hours, to crystallize zeolite Y. After crystallization was completed, the solids were separated from the liquor by filtration and washing. The dried product was identified and characterized by chemical, adsorbtion and X-ray analyses as crystalline zeolite Y of about 89% purity, with an $SiO_2/Al_2O_3$ ratio of 3.32.

Example 8

The procedure in this example was essentially the same as that of Example 5 but using an acid-extracted and refired portion of meta-kaolin having an $SiO_2/Al_2O_3$ molar ratio of 10.0. The reactant mixture composition was:

| | |
|---|---|
| $Na_2O/SiO_2$ | 1.0 |
| $SiO_2/Al_2O_3$ | 10.0 |
| $H_2O/Na_2O$ | 40 |

The product was crystalline zeolite Y of 91–95% purity, with an $SiO_2/Al_2O_3$ molar ratio of 3.21.

Example 9

In a procedure essentially the same as in Example 7, an aqueous reactant mixture was prepared from acid-extracted and refired meta-kaolin ($SiO_2/Al_2O_3$ molar ratio=6.7), sodium silicate, sodium hydroxide and water to achieve the following overall molar composition:

| | |
|---|---|
| $Na_2O/SiO_2$ | 0.50 |
| $SiO_2/Al_2O_3$ | 11.2 |
| $H_2O/Na_2O$ | 40 |

The two-step aging (room temperature) and crystallization (100° C.) periods were 72 hours each. The product was crystalline zeolite Y of 92–100% purity, with an $SiO_2/Al_2O_3$ molar ratio of 3.59.

What is claimed is:

1. Process for preparing crystalline zeolitic molecular sieves which comprises contacting and leaching a reactive kaolin containing not more than about 30 percent residual crystallinity with an aqueous mineral acid solution to increase the $SiO_2/Al_2O_3$ molar ratio thereof to within the range of from about 6 to about 270, drying the leached solid kaolin residue, firing said kaolin residue at a temperature of from about 550° C. to about 825° C. for a period of at least about 1 hour, forming a reaction mixture containing said fired kaolin residue and having in the aggregate water, alkali metal hydroxide, and the oxides of silicon and aluminum in proportions required to form crystals of the desired zeolitic molecular sieve, thermally treating the mixture at a temperature between about 20° C. and about 120° C. under at least autogenous pressure until crystals of the zeolitic molecular sieve form, and thereafter separating and recovering the zeolite crystals.

2. Process according to claim 1 wherein the reactive amorphous kaolin leached with a mineral acid is meta-kaolin.

3. Process for preparing crystalline zeolite Y which comprises contacting and leaching meta-kaolin with an aqueous mineral acid solution to increase the $SiO_2/Al_2O_3$ molar ratio thereof to within the range of from about 6 to about 30, drying the leached solid meta-kaolin residue, firing said dried residue at a temperature of from about 550° C. to about 825° C. from about 1 to about 24 hours, forming a reaction mixture containing said fired meta-kaolin residue and having in the aggregate water, sodium hydroxide, and the oxides of silicon and aluminum in proportions within the compositional range expressed in terms of oxide-mole ratios.

| | |
|---|---|
| $Na_2O/SiO_2$ | 0.75–1.0 |
| $SiO_2/Al_2O_3$ | About 6–30 |
| $H_2O/Na_2O$ | About 40–60 | thermally treating the mixture at a temperature between about 20° C. and about 120° C. under at least autogenous pressure until zeolite Y crystals form, and thereafter separating and recovering the zeolite Y crystals.

4. Process for preparing crystalline zeolite Y which comprises contacting and leaching meta-kaolin with an aqueous mineral acid solution to increase the $SiO_2/Al_2O_3$ molar ratio thereof to within the range of from about 6 to about 30, drying the leached solid meta-kaolin residue, firing said dried residue at a temperature of from about 550° C. to about 825° C. from about 1 to about 24 hours, forming a reaction mixture containing said fired meta-kaolin residue and having in the aggregate water, sodium hydroxide, and the oxides of silicon and aluminum in proportions within the compositional range expressed in terms of oxide-mole-ratios

| | |
|---|---|
| $Na_2O/SiO_2$ | 0.40–0.60 |
| $SiO_2/Al_2O_3$ | About 6–30 |
| $H_2O/Na_2O$ | About 20–60 | thermally treating the mixture at a temperature between about 20° C. and about 120° C. under at least autogenous pressure until zeolite Y crystals form, and thereafter separating and recovering the zeolite Y crystals.

5. Process for preparing crystalline zeolite Y which comprises contacting and leaching meta-kaolin with an aqueous mineral acid solution to increase the $SiO_2/Al_2O_3$ molar ratio thereof to within the range of from about 6 to about 30, drying the leached solid meta-kaolin residue, firing said dried residue at a temperature of from about 550° C. to about 825° C. from about 1 to about 24 hours, forming a reaction mixture containing said fired meta-kaolin residue and having in the aggregate water, sodium hydroxide, and the oxides of silicon and aluminum in proportions within the compositional range expressed in terms of oxide-mole ratios

| | |
|---|---|
| $Na_2O/SiO_2$ | 0.4–0.6 |
| $SiO_2/Al_2O_3$ | 6.5–14 |
| $H_2O/Na_2O$ | About 40 | thermally treating the mixture at a temperature between about 20° C. and about 120° C. under at least autogenous pressure until zeolite Y crystals form, and thereafter separating and recovering the zeolite Y crystals.

6. Process according to claim 3 wherein the aqueous mineral acid solution is hydrochloric acid.

7. Process according to claim 6 wherein the hydrochloric acid solution is about 4 normal.

References Cited

UNITED STATES PATENTS

| | | | |
|---|---|---|---|
| 3,065,054 | 11/1962 | Haden et al. | 23—112 |
| 3,094,383 | 6/1963 | Dzierzanowski et al. | 23—112 |
| 3,116,973 | 1/1964 | Haden | 252—450 X |
| 3,119,660 | 1/1964 | Howell et al. | 23—112 |
| 3,130,007 | 4/1964 | Breck | 23—113 |
| 3,140,251 | 7/1964 | Plank et al. | 252—455 X |
| 3,213,038 | 10/1965 | Chomitz | 252—450 |

EDWARD J. MEROS, *Primary Examiner.*